United States Patent [19]

Bandyopadhyay

[11] Patent Number: 5,791,275
[45] Date of Patent: Aug. 11, 1998

[54] SURFACE LAYER COMPRISING MICRO-FABRICATED TILES FOR ELECTROMAGNETIC CONTROL OF FLUID TURBULENCE IN SEA WATER

[75] Inventor: Promode R. Bandyopadhyay, Barrington, R.I.

[73] Assignee: The United States of America as represented by the Secretary of the Navy, Washington, D.C.

[21] Appl. No.: 668,031

[22] Filed: Jun. 14, 1996

[51] Int. Cl.$^6$ .................................................. B63B 1/32
[52] U.S. Cl. .................................. 114/67 R; 244/205
[58] Field of Search .................. 114/67 R; 244/205, 244/130

[56] References Cited

U.S. PATENT DOCUMENTS

| | | | |
|---|---|---|---|
| 5,273,465 | 12/1993 | Meng | 440/6 |
| 5,320,309 | 6/1994 | Nosenchuck | 244/205 |
| 5,359,574 | 10/1994 | Nadolink | 367/1 |
| 5,437,421 | 8/1995 | Nosenchuck | 244/205 |

*Primary Examiner*—Sherman Basinger
*Attorney, Agent, or Firm*—Michael J. McGowan; Prithvi C. Lall; Michael F. Oglo

[57] ABSTRACT

A surface layer for use in connection with an object adapted for motion through a fluid includes an array of tiles each having a pair of electrodes and a pair of magnetic poles positioned to generate respective electric and magnetic fields generally transverse to each other. Either or both of the electrodes or magnetic poles are controllable to provide adjustable electrical and/or controllable magnetic fields. A plurality of turbulence sensors is provided each located proximate to and generally upstream of a tile. Each turbulence sensor generating a turbulence signal representative of fluid turbulence proximate thereto. A control circuit for controlling the electrical field generated by the electrodes and/or the magnetic field generated by the magnetic pole in relation to the turbulence signal from the turbulence sensors, thereby to generate a Lorentz force for controlling the fluid. The length and time scales of the electro-magnetic tiles can be matched to those of near-wall turbulence in high Reynolds number flows. The tiles can be fabricated using silicon micro-fabrication or printed circuit board techniques, which provides for cost-effective fabrication and ensures relatively lightweight and reduced energy requirements. Due to their smallness, plurality and amenability, digital microprocessor technology with appropriate algorithm maybe used to control near-wall turbulence.

20 Claims, 6 Drawing Sheets

SURFACE LAYER COMPRISING MICRO-FABRICATED TILES FOR ELECTROMAGNETIC CONTROL OF FLUID TURBULENCE IN SEA WATER

STATEMENT OF GOVERNMENT INTEREST

The invention described herein may be manufactured by or for the Government of the United States of America for Governmental purposes without the payment of any royalties thereon or therefor.

BACKGROUND OF THE INVENTION

(1) Field of the Invention

The invention relates generally to the field of systems for controlling high Reynolds number turbulent boundary layers formed around objects moving through a fluid such as seawater plasma, or the like, and more particularly to active boundary layer control using electromagnetohydrodynamic technology wherein length and time scales involved match those of high Reynolds number near-wall turbulence.

(2) Description of the Prior Art

It is known that control of turbulence and vortices in the boundary layer flow around an object moving through a fluid, such as a marine hull moving through seawater, or atmospheric re-entry vehicles, and the like, reduces both drag and radiated noise. Additionally, loaded surfaces, such as diving planes and rudders, or thrusting surfaces such as propellers or screws, can operate at higher performance coefficients when turbulent boundary layer control systems are used. Various types of active boundary layer control systems have been designed using, for example, heating of the hull surface, injection of micro-bubbles, high strain-rate polymers, suction to draw off the inner boundary layer, and injection of high-velocity flow along the inner boundary layer. The first three (heating of the hull surface, injection of micro-bubbles, and high strain-rate polymers) are based on modifying the flow properties in the turbulent boundary layer. The fourth (suction to draw off the inner boundary layer), commonly referred to as suction boundary layer control, depends on drawing off the low speed flow in the boundary layer near the vehicle hull so that the natural turbulence production cycle will be disrupted. The last type (injection of high-velocity flow along the inner boundary layer) is blowing boundary layer control in which an energized stream is injected into the boundary layer, thereby accelerating the inner flow lines thereby reducing vorticity and turbulence. Problems arise, however, with each of these systems. They generally add weight and volume, and add a substantial energy load to the vehicles in which they are used.

U.S. Pat. No. 5,273,465, entitled Magnetohydrodynamic Boundary Layer Control System, issued Dec. 28, 1993, to James C. S. Meng, and assigned to the assignee of the present invention, describes a boundary layer control system for use in connection with a vehicle such as a torpedo, which uses electromagneto-hydrodynamic principles. The boundary layer control system described in that patent comprises a plurality of magnets and seawater electrodes which are placed circumferentially around the vehicle to provide electric and magnetic fields that provide a Lorentz force on the seawater surrounding the vehicle to reduce turbulence and relaminarize flow in the boundary layer.

However, in the prior art, no attempt has been made to match the length and time scales of the electromagnetic field to those of near-wall turbulence at high Reynolds numbers.

SUMMARY OF THE INVENTION

It is therefore an object of the invention to provide a new and improved surface layer comprising micro-fabricated tiles for electromagneto-hydrodynamic control of high Reynolds number near-wall fluid turbulence around a vehicle moving electrically-conducting through an electrically-conductive fluid such as seawater and the like.

In brief summary, the invention provides a surface layer for use in connection with an object adapted for motion through a fluid includes an array of tiles each having a pair of electrodes and a pair of magnetic poles positioned to generate respective electric and magnetic fields generally transverse to each other. Either or both of the electrodes or magnetic poles are controllable to provide adjustable electrical and/or controllable magnetic fields. A plurality of turbulence sensors is provided with each located proximate to and generally upstream of a tile. Each turbulence sensor generates a turbulence signal representative of fluid turbulence proximate thereto. A control circuit for controlling the electrical field generated by the electrodes and/or the magnetic field generated by the magnetic poles in relation to the turbulence signal from the turbulence sensors, generates a Lorentz force for controlling the fluid. The tiles can be fabricated using printed circuit board or single crystal silicon by micro-fabrication techniques, which provides for cost-effective fabrication and ensures relatively light weight and reduced energy requirements.

The length and time scales of the magnets and electrodes are such that they match those of high Reynolds number near-wall turbulence. The tiles may be powered individually or in groups. They may be controlled by microprocessors to generate traveling waves of Lorentz forces perturbations.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DESCRIPTION OF THE PREFERRED EMBODIMENT

Figure 1:
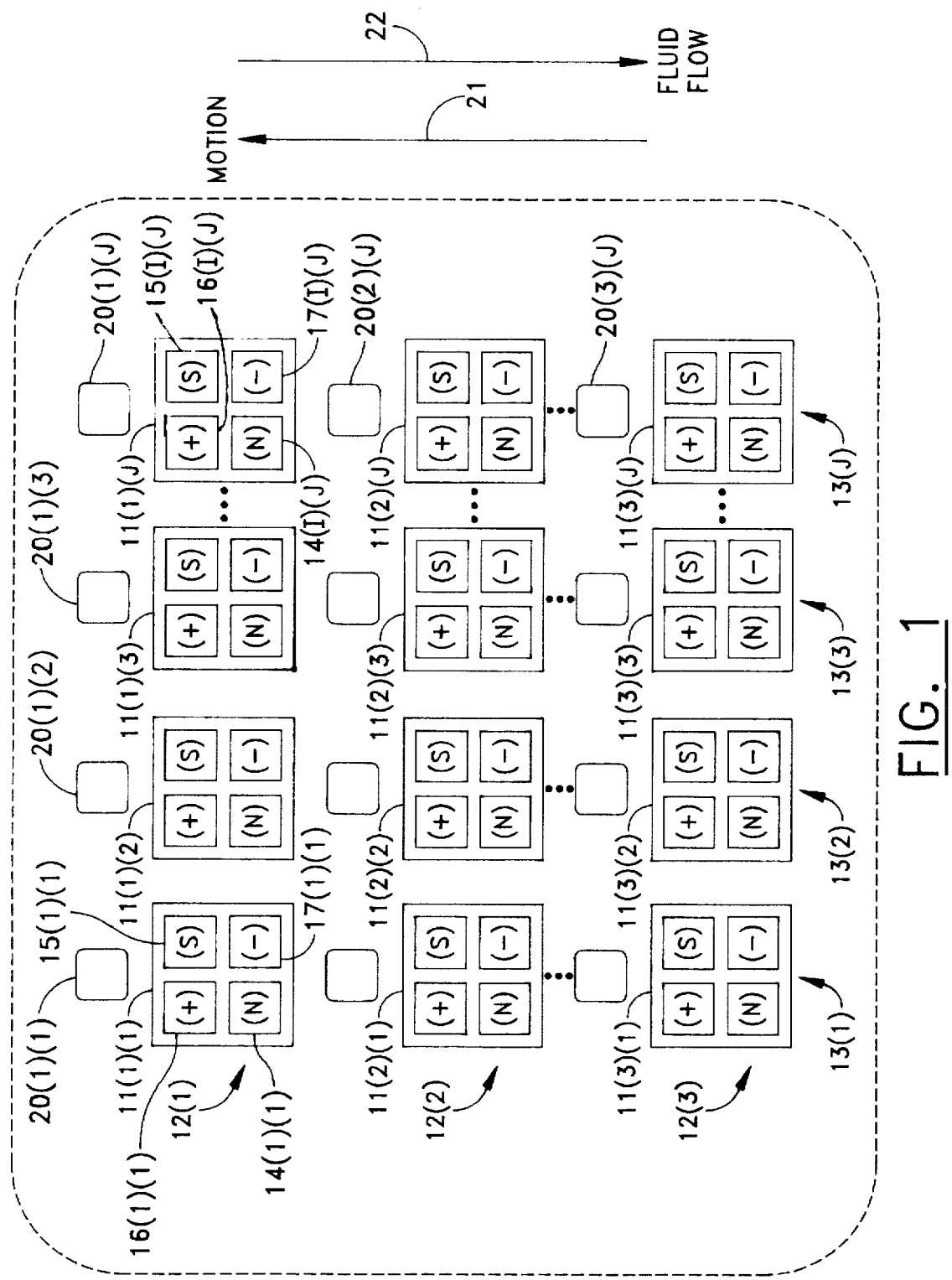
FIG. 1 depicts a plan view of a surface comprising micro-fabricated tiles for magnetohydrodynamic control of turbulence around a vehicle moving through a fluid such as seawater and the like, constructed in accordance with the invention.
Figure 2:
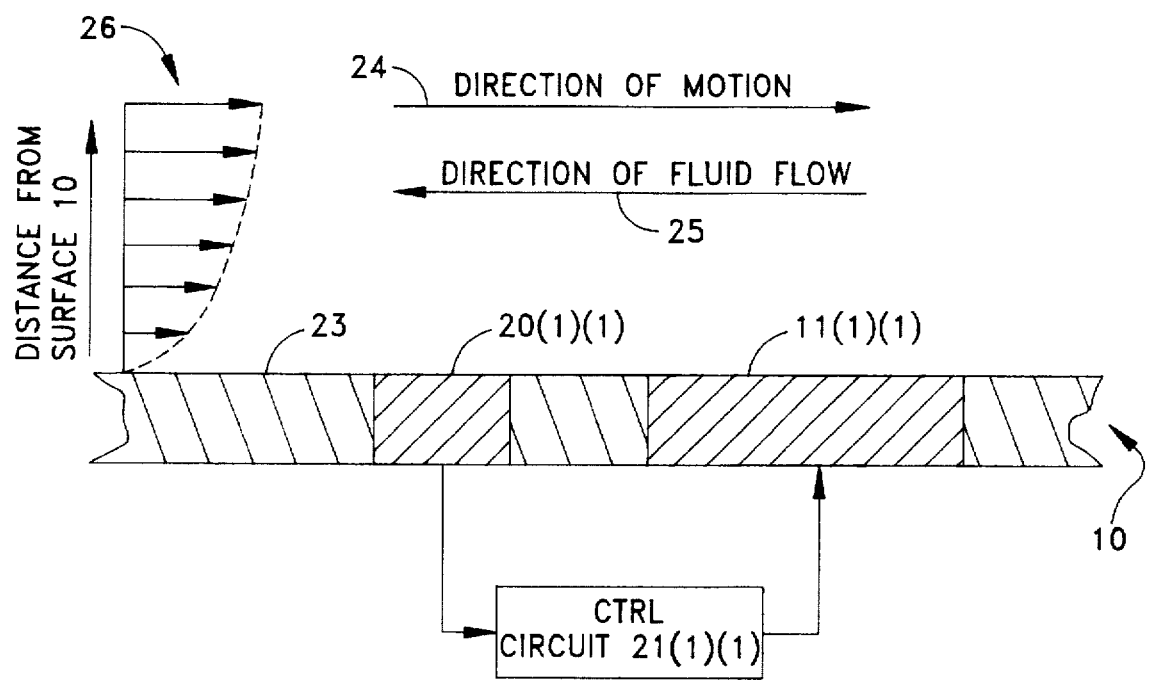
FIG. 2 depicts a schematic diagram illustrating a cross section of a portion of the surface depicted in FIG. 1, specifically depicting the cross-section of a single tile and circuitry for controlling the tile.

FIG. 1 is a plan view of a surface 10 for electromagneto-hydrodynamically controlling turbulence around a vehicle moving through a fluid such as seawater and the like. With reference to FIG. 1, surface layer 10 comprises a plurality of tiles 11(1)(1) through 11(I)(J) (generally identified by reference numeral 11(i)(j)) organized in a series of rows 12(1) through 12(I) (generally identified by reference numeral 12(i)) and columns 13(1) through 13(J) (generally identified by reference numeral 13(j)) to form a surface of a vehicle (not shown) which can move through a fluid. As will be described below in greater detail, each tile 11(i)(j) includes north and south magnetic poles 14(i)(j) and 15(i)(j), respectively, and positive and negative electrodes 16(i)(j) and 17(i)(j), respectively, on which an adjustable electrical charge can be placed, to provide a Lorentz force on the fluid that can reduce or argument turbulence and vorticities which may form proximate the tile. The electrical charge of each tile can be adjusted under control of a control circuit 21(i)(j). One such circuit is shown in FIG. 2, and it adjusts the electrical charge on the electrodes in relation to the local turbulence as determined by a turbulence sensor 20(i)(j), which may be, for example, a wall-shear or wall pressure sensor that is located proximate to, and immediately upstream of, the tile being controlled. In operation, the vehicle moves through the fluid in a direction represented in FIG. 1 by an arrow 21, and thus the relative direction of fluid flow across surface 10 during motion is shown by the oppositely-directed arrow 22. The tiles 11(i)(j) are all identical, and fabricated using silicon micro-fabrication or printed circuit board techniques as described below.

FIG. 2 depicts a schematic diagram illustrating a cross section of a portion of the surface layer 10 depicted in FIG. 1, specifically depicting the cross-section of a single tile, identified by reference numeral 11(1)(1), the associated turbulence sensor 20(1)(1), and a control circuit 21(1)(1) for controlling the tile. With reference to FIG. 2, the surface 10 includes an upper surface 23 that comes in contact with the fluid when the vehicle is in operation. The vehicle moves through the fluid in a direction represented in FIG. 2 by an arrow 24, and thus the relative direction of fluid flow across upper surface 23 during motion is shown by the oppositely-directed arrow 25.

As the vehicle moves through the fluid, a boundary layer is formed in the fluid proximate the upper surface 23 due to frictional and drag effects, the boundary layer having a relative speed profile illustrated in FIG. 2 by graph 26. Graph 26 illustrates a profile of the relative speed of the fluid over the surface 10 as the vehicle moves through the fluid, with increasing distance from the surface 10. Graph 26 comprises a plurality of arrows at various displacements from the part 23 of surface 10. In graph 26, the arrows at increasing displacements from part 23 have increasing lengths. The relative lengths of the arrows represents the relative speed of the fluid, relative to the speed of the surface 10, as the vehicle moves through the fluid, and illustrates that frictional forces between the surface 10 and the narrow layer of fluid proximate thereto operates as a drag on a narrow layer of fluid with it as the vehicle moves through the fluid. The boundary layer is defined as fluid layer proximate the part 23 at which the relative speed of the fluid, relative to surface 10, is less than 95% of the freestream relative speed.

As noted above, control circuit 21(1)(1) controls tile 11(1)(1) in relation to the associated turbulence sensor 20(1)(1). As is conventional, the turbulence sensor 20(1)(1) generates signals that indicate the relative turbulence and vorticity of the fluid in the boundary layer proximate thereto. The control circuit 21(1)(1) receives the relative turbulence/vorticity signals from the turbulence sensor 20(1)(1) and generates a control signal that, in one embodiment, controls the level of the electrical charge on the respective positive and negative electrodes 16(1)(1) and 17(1)(1) of the tile 11(1)(1). The electrical charge on the electrodes 16(1)(1) and 17(1)(1), in turn, results in the generation of an electrical field (not shown) which extends out into the fluid. The electrical field generated by the electrodes 16(1)(1) and 17(1)(1), is generally transverse to the magnetic field generated by the magnetic poles 14(1)(1) and 15(1)(1), resulting in generation of a Lorentz (electromagneto-hydrodynamic) force on the fluid, which, in turn, tends to reduce the amount of turbulence and vorticity that is proximate the surface 10.

Figure 3:
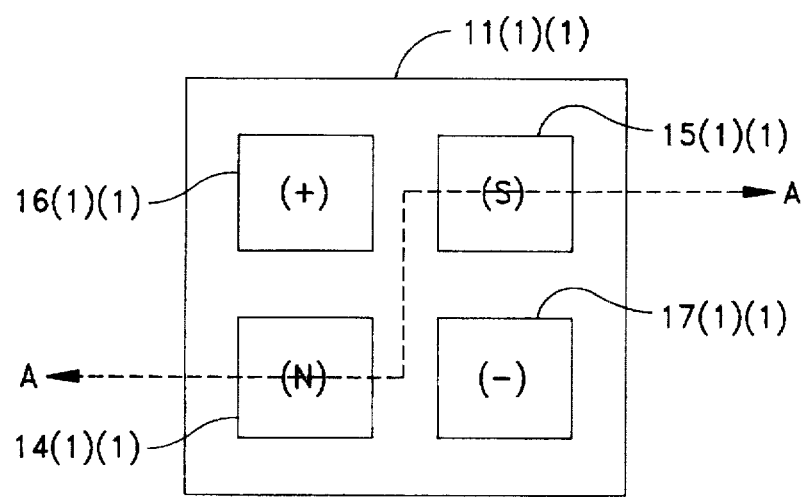
FIGS. 3 through 7 depict cross-sectional views that are useful in understanding construction of a tile depicted in FIG. 1 using single crystal silicon micro-fabrication techniques.

FIGS. 4 through 7 depict cross-sectional views of tile 11(1)(1), taken along the line A—A in FIG. 3, that are useful in understanding construction of the tile using single crystal silicon micro-fabrication techniques. The line A—A defines a section that is through the magnetic poles 14(1)(1) and 15(1)(1), but it will be appreciated that the electrodes 16(1)(1) and 17(1)(1) can be fabricated contemporaneously with fabrication of the magnetic poles using similar techniques. The tile is fabricated from a material, such as single crystal silicon or the like, which is susceptible to micro-fabrication techniques.

Figure 4:
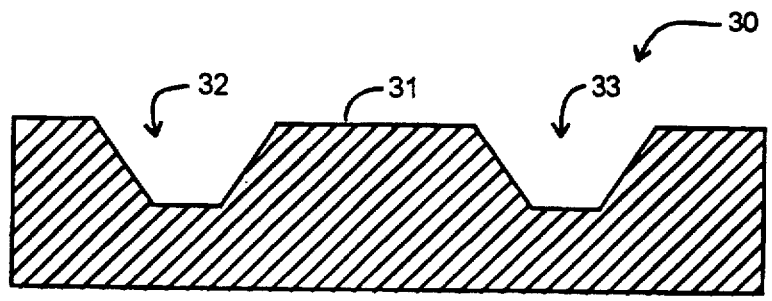

With reference to FIG. 4, initially a wafer 30 of crystalline silicon is created in a conventional manner having a surface 31 which is oriented along the <100> crystal face. It should be noted that surface 31 will, after the tile is fabricated, form the part 23 (FIG. 2) of the tile. The wafer 30 will preferably have a thickness of on the order of 300 to 700 microns. Recesses 32 and 33 (along with other recesses (not shown) fabricated for the electrodes 16(1)(1) and 17(1)(1)) are formed using conventional etching techniques. For example, depositing a layer of photo-resist, exposing the photoresist and removing the exposed photo-resist to create apertures, applying an etchant such as an acid, and removing the remaining photo-resist. The surfaces of the recesses preferably will be formed on the <111> crystal face of the silicon crystal and will have an angle of 54 degrees relative to the surface 31.

Figure 5:
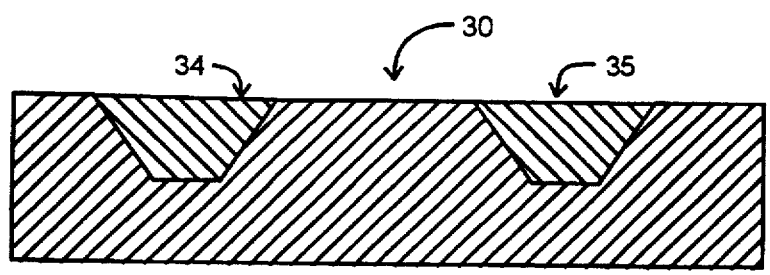
Figure 6:
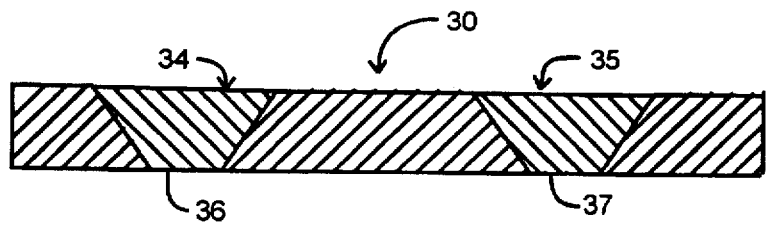
Figure 7:
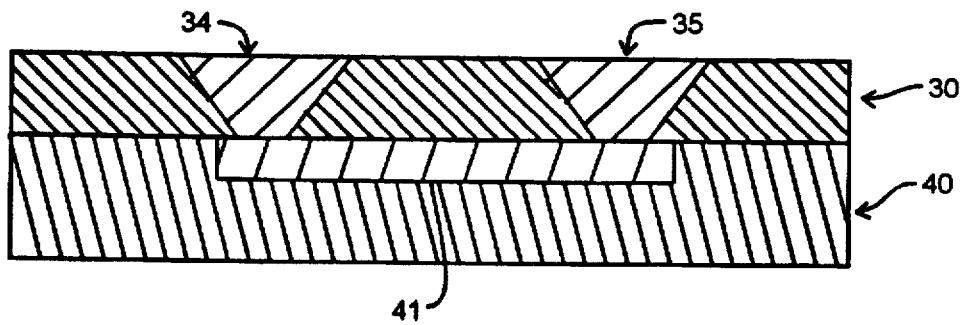

After the recesses are formed, magnetic material 34 and 35 is deposited therein, as shown in FIG. 5. The magnetic material 34 and 35 will be used to create the magnetic poles 14(1)(1) and 15(1)(1). For the electrodes 16(1)(1) and 17(1)(1), electrically conductive material is deposited in the recesses (not shown) created therefor. Thereafter, as shown in FIG. 6, the lower surface of the wafer 30 is etched away to expose the lower surface 36 and 37 of the magnetic material 34 and 35, respectively, as well as the electrically conductive material in the recesses created for the electrodes 16(1)(1) and 17(1)(1).

After etching the lower surface of wafer 30 (FIG. 6) to expose the surfaces 36 and 37, the wafer 30 is mated to a second wafer 40. Wafer 40 includes a length of magnetic material 41 that extends in a diagonal recess across the wafer, in registration with the magnetic poles 14(1)(1) and 15(1)(1). The magnetic material 41 is provided to complete a magnetic circuit including the magnetic poles 14(1)(1) and 15(1)(1). Wafer 40 further includes vias (not shown) or electrically-conductive material that is in registration with the electrically-conductive material in the recesses provided in wafer 30 for the electrodes 16(1)(1) and 17(1)(1), to facilitate a connection to the control circuit 21(1)(1).

Although the invention has been described as providing a surface 10 comprising tiles 11(i)(j) in which the magnitude of the magnetic field generated by the magnetic poles 14(i)(j) and 15(i)(j) is fixed, and only the magnitude electrical field generated by electrodes 16(i)(j) and 17(i)(j) can be varied, it will be appreciated that the surface 10 may instead comprise tiles in which the magnetic field is varied, either instead of or in addition to the variation of the electrical field. It should be noted that the direction of the respective electrical and magnetic fields are fixed by the positions of the electrodes and magnetic poles. In such an embodiment, in addition to providing the magnetic material 41, wafer 40 may also include an electrically conductive winding around the magnetic material 41 which is controllable by the control circuit 21(i)(j) to vary magnitude of the magnetic field.

The invention provides a number of advantages. For example, the lateral dimensions of the tiles can be easily made to be on the order of the turbulence scale, including that for fluids having very high Reynolds numbers. In addition, the tiles will accommodate varying vehicle speeds, since groups of the tiles can be grouped and controlled in unison, thereby accommodating varying turbulence scales resulting from the varying vehicle speeds. Furthermore, the surface 10 provides the capability of rapidly controlling the origin of turbulence by using variations in Lorentz force generated by tile rows, columns or diagonals of any angle to generate planar waves to control instability waves and turbulence vortices which are formed after breakdown of the fluid's mean flow. Surface 10 including tiles constructed in accordance with the invention also operate by confining their electric and magnetic fields relatively close to surface 10, which result in relatively low power consumption.

It will be appreciated that numerous modifications may be made to the invention. For example, instead of providing individual magnetic poles 14(i)(j) and 15(i)(j), the tiles may provide a moving magnet constructed much as in a linear motor with sliding magnets, which magnets would be enabled to move generally along with turbulence eddies formed near the surface 10. In addition, the control circuits 21(i)(j) may be controlled in unison to provide pulsing of the electrical or magnetic fields which may be advantageous in breaking up turbulence or vortices. The control circuits 21(i)(j) for rows, columns or diagonals of any angle may also be controlled in unison to generate planar waves. Furthermore, the tiles may be fabricated from a variety of materials, in addition to silicon, such as conducting polymers which may facilitate fabrication of flexible and curved tiles.

Figure 8A:
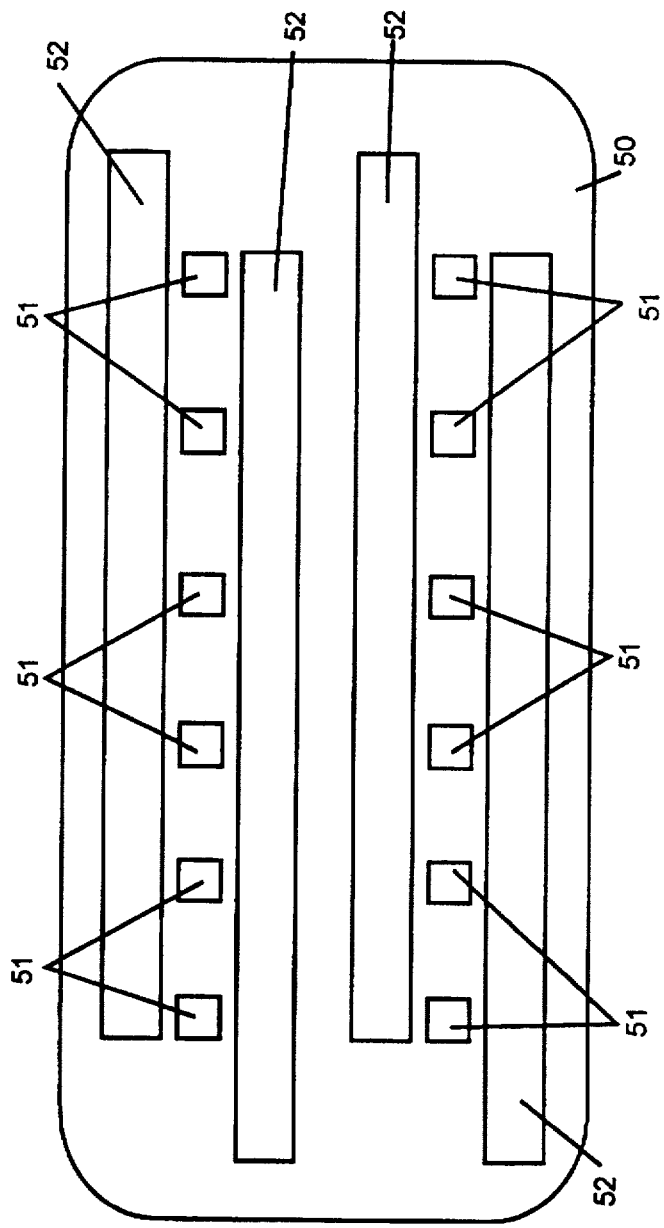
FIG. 8A is a top view of a printed circuit board after electroplating in an alternative embodiment of the invention.
Figure 8B:
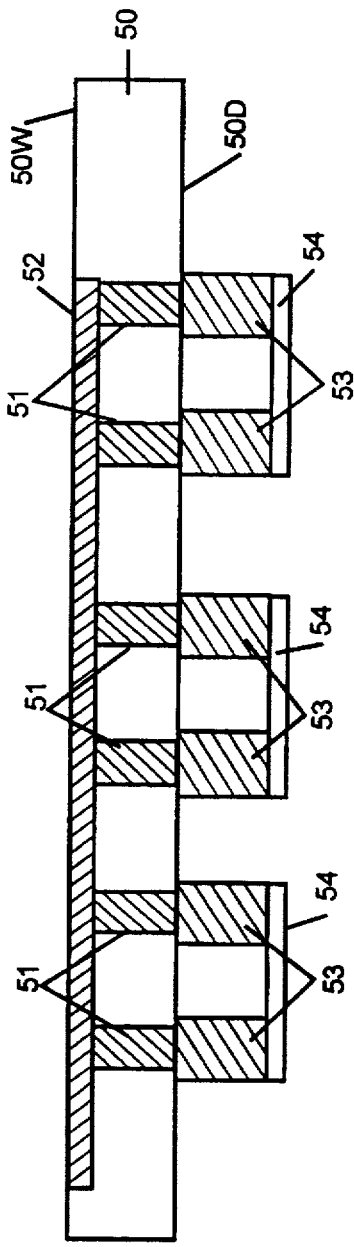
FIG. 8B is a representation of a cross-sectional view of the embodiment depicted in FIG. 8A.

In an alternate embodiment, depicted in FIGS. 8A and 8B, copper electrodes 52 may be electroplated on thin, flexible printed circuit boards 50. Regions between the electrodes 52 may be milled out and filled with nichol-iron magnetic poles 51 by means of electroplating. Strips of permanent magnets 53 may be attached, using any epoxy, to the poles underneath the printed circuit boards adjacent to the magnetic pole 51. Thin steel plates 54 or other magnetically-conductive material may be used to close a magnetic circuit on the underside (dry side 50D) of the printed circuit board. The entire permanent magnet and steel plate assembly may be attached to the printed circuit board for integrity. Insulating and corrosion resistant lacquers may be coated on the copper electrodes (wet side 50W) to de-activate tiles (provide a zero Lorentz force due to the absence of any electric potential, where Lorentz force may otherwise be present), which may have the undesirable effect of enhancing turbulence. Electrodes 52 may be gold-plated to reduce seawater corrosion.

Figure 9:
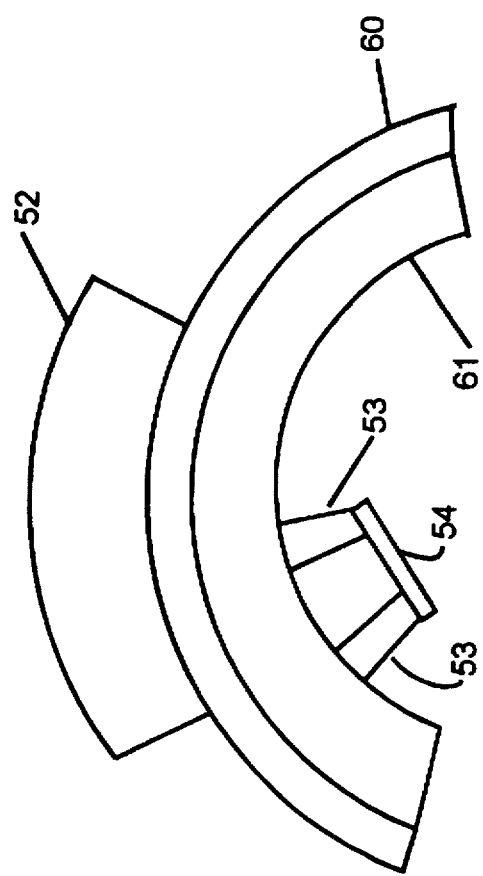
FIG. 9 is a representation of a cross-sectional view of a modification of the embodiment depicted in FIGS. 8A and 8B, applied to an axi-symmetric body.
Figure 10:
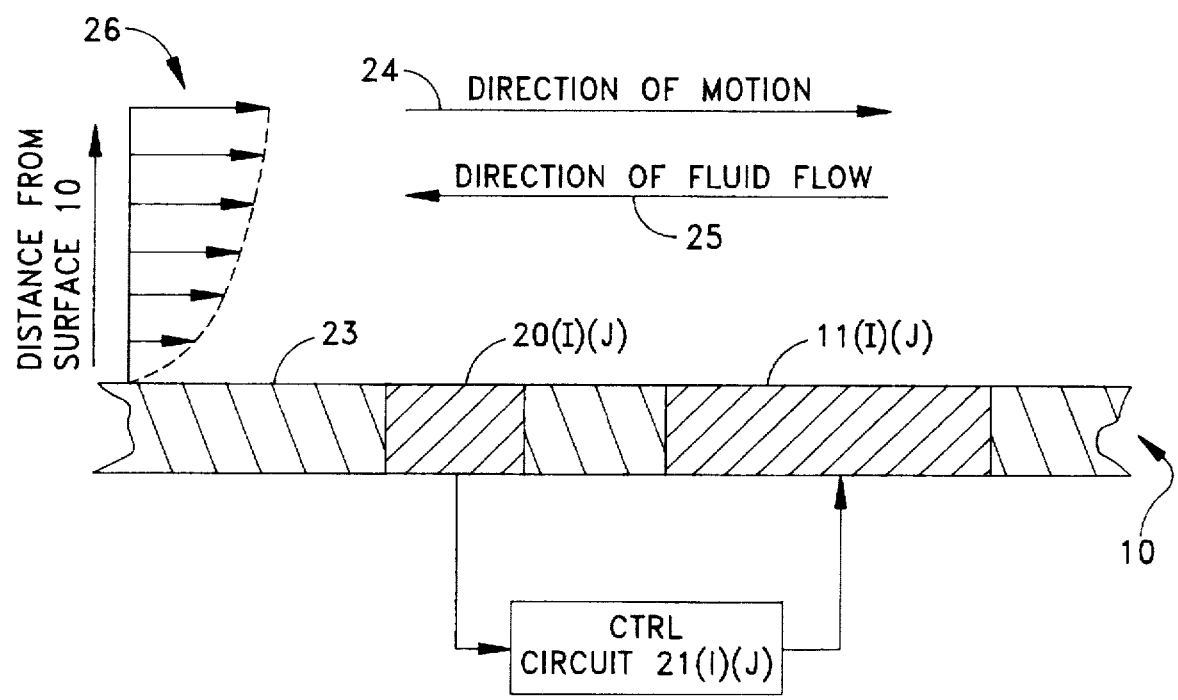
FIG. 10 depicts a schematic diagram illustrating a cross section of a portion of the surface layer depicted in FIG. 1 and which is similar to FIG. 2 with the additional numerals discussed on page 6 of the specification provided therein.

An illustration of the embodiment described above in connection with FIGS. 8A and 8B, as applied to an axisymmetric body, is depicted in FIG. 9. With reference to FIG. 9, the axi-symmetric body comprises a thin plastic sheet 60 reinforced with an electrical-grade fiberglass 61. The thin plastic sheet illustratively comprises DuPont pyrolux LF 0110, which is commonly used to make flexible printed circuits. The electrode 52 is mounted on the plastic sheet 60, and magnetic poles 53 and plates 54 are mounted under the fiberglass, in a manner similar to that depicted in FIGS. 8A and 8B.

The preceding description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A surface layer for use in connection with an object adapted for motion through a fluid, the surface layer comprising:

an array of tiles each having a pair of controllable electrodes and a pair of magnetic poles positioned to generate respective electric and magnetic fields generally transverse to each other;

a plurality of turbulence sensors each one of which is located proximate to and generally upstream of a tile, each turbulence sensor generating a turbulence signal representative of fluid turbulence proximate thereto; and an electrical control circuit for controlling the electrical field generated by the electrodes in relation to the turbulence signal from the turbulence sensors, thereby to generate a Lorentz force to control the generation of turbulence and vorticities in the fluid as the object moves therethrough.

2. The surface layer as defined in claim 1 wherein said electrical control circuit controls the electrical field generated by the electrodes of each of said tiles in relation to the turbulence signal generated by the turbulence sensor proximate thereto.

3. The surface layer as defined in claim 1 in which said tiles are manufactured using silicon micro-fabrication techniques.

4. The surface layer as defined in claim 3 wherein said surface layer is made of single crystal wafers.

5. The surface layer of claim 4 wherein groups of said tiles are grouped and controlled in unison, to accommodate varying turbulence scales resulting from the varying speeds through said fluid.

6. The surface layer as defined in claim 1 wherein said tiles are manufactured using printed circuit board electroplating techniques.

7. The surface layer of claim 6 wherein said tiles have length and time scales matching those of the near-wall turbulence.

8. The surface layer of claim 7 wherein arrays of said tiles in different patterns may be acted synchronously so as to produce traveling wave effects and produce spatially varying Lorentz force at any given time.

9. The surface layer as defined in claim 6 in which said tiles are planar.

10. The surface layer as defined in claim 6 in which said tiles are formed of a flexible material.

11. The surface layer as defined in claim 1 in which a said tile is manufactured according to the steps of:

providing a wafer of a selected micro-fabricatable material;

etching recesses in the wafer to accommodate a pair of magnetic poles and a pair of electrodes;

depositing a magnetic material in the recesses formed to accommodate said pair of magnetic poles and further depositing a conductive material in the recesses and accommodate said pair of electrodes; and providing a magnetic material between the magnetic material in the respective recesses to thereby facilitate completion of a magnetic circuit therebetween.

12. The surface layer as defined in claim 11 further comprising the step of providing connections between the conductive material for connection to the control circuit.

13. A surface layer for use in connection with an object adapted for motion through a fluid, the surface layer comprising:

an array of tiles each having a pair of electrodes and a pair of controllable magnetic poles positioned to generate respective electric and magnetic fields generally transverse to each other;

a plurality of turbulence sensors each located proximate to and generally upstream of a tile, each turbulence sensor generating a turbulence signal representative of fluid turbulence proximate thereto; and a control circuit for controlling the magnetic field generated by the magnetic poles in relation to the turbulence signal from the turbulence sensors, thereby to generate a Lorentz force to control the generation of turbulence and vorticities in the fluid as the object moves therethrough.

14. The surface layer as defined in claim 13 in which the control circuit controls the magnetic field generated by the electrodes of each tile in relation to the turbulence signal generated by the turbulence sensor proximate thereto.

15. A surface layer as defined in claim 14 in which said tiles are planar.

16. A surface layer as defined in claim 14 in which said tiles are formed of a flexible material.

17. A surface layer as defined in claim 14 in which said tiles are manufactured using micro-fabrication techniques.

18. A surface layer as defined in claim 14 in which each member of said tiles is manufactured according to the steps of:

providing a wafer of a selected micro-fabricatable material;

etching recesses in the wafer to accommodate a pair of magnetic poles and a pair of electrodes;

depositing a magnetic material in the recesses formed to accommodate said pair of magnetic poles and further depositing a conductive material in the recesses to accommodate said pair of electrodes; and providing a magnetic material between the magnetic material in the respective recesses to thereby facilitate completion of a magnetic circuit therebetween.

19. The surface layer as defined in claim 18 further comprises connections between the conductive material to the control circuit.

20. The surface layer as defined in claim 13 in which said tiles are manufactured using printed circuit board electroplating techniques.

* * * * *